Patented June 12, 1934

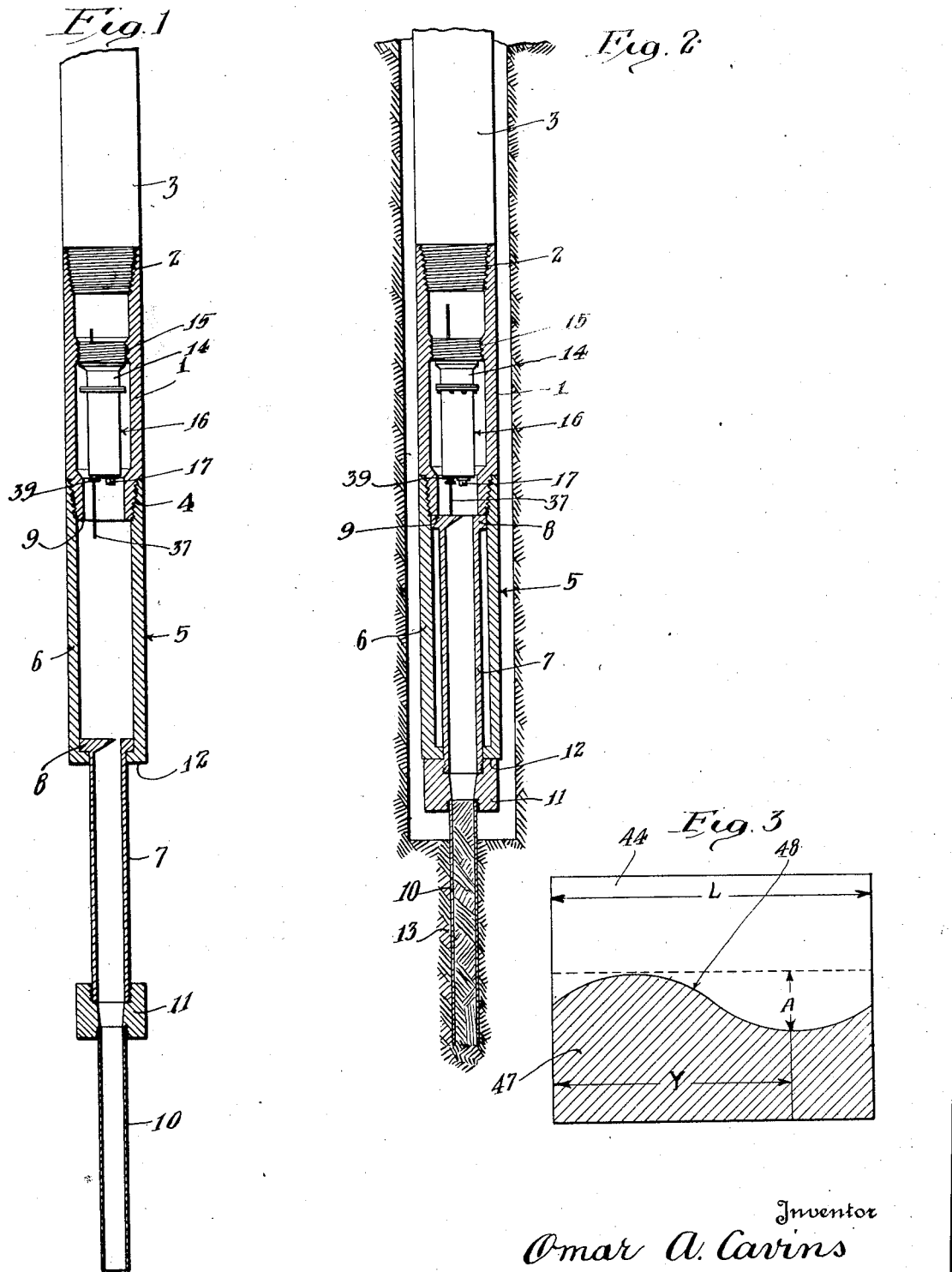

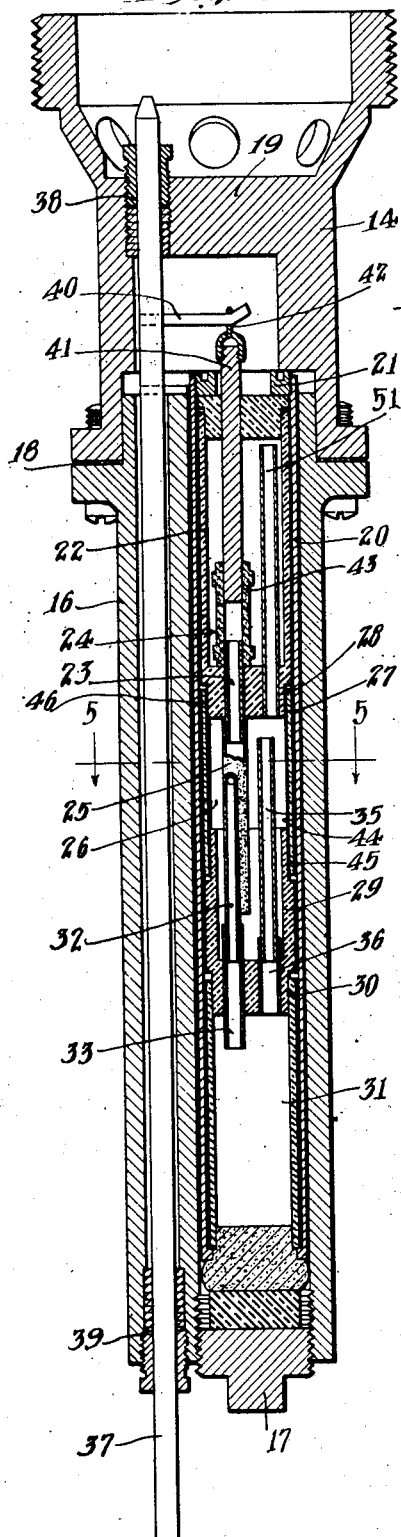

1,962,634

UNITED STATES PATENT OFFICE 1,962,634

INCLINATION RECORDING MECHANISM FOR OIL WELLS

Omar A. Cavins, Glendale, Calif., assignor to Standard Oil Company of California, San Francisco, Calif., a corporation of Delaware Application August 31, 1927, Serial No. 216,545

6 Claims. (Cl. 234—5.3)

This invention relates to an inclination recording mechanism for oil wells, and is more particularly related to a mechanism adapted for recording the inclination of holes or wells, such for example as gas, oil, water or the like formed in the ground.

In the drilling of wells, particularly in the drilling of oil and gas wells, it is desirable to know the inclination to which the well is drilled, particularly at the location of the oil sands or formation in order that the inclination or dip and strike of the oil formation or sands may be determined.

It is, therefore, an object of this invention to provide a mechanism for recording the inclination of oil gas, or like wells which includes means adapted to be inserted into the well and to be actuated at the desired point to form a permanent record of the inclination of the hole at that point.

Another object of this invention is to provide a mechanism for recording the inclination of wells which is adapted to be connected with a sample taking device and is adapted to be actuated during or immediately after the taking of the sample of formation to record the inclination of the hole being formed at the point the sample is being taken.

Another object of this invention is to provide a device for recording the inclination of wells including a container for a solution having a valve controlled outlet, means for tripping the valve, a recording chamber into which the liquid from the container drains, means within the recording chamber for recording the position of the liquid therein, and means adapted to be actuated after the liquid within the recording chamber has formed the permanent record for draining the liquid from the chamber to prevent the liquid in the recording chamber from marring the record so formed.

Other objects and advantages of this invention, it is believed, will be apparent from the following detailed description of a preferred embodiment thereof, as illustrated in the accompanying drawings.

In the drawings:

Figure 1 is a sectional elevation of a sample taking device illustrating the same as operatively connected with the means for recording the inclination of a well in side elevation and as embodying this invention.

Figure 2 is a similar sectional elevational view showing the sample taking device as in position in the well and as taking a sample and as actuating to cause the recording means embodying this invention to operate.

Figure 3 is a diagrammatic view of a chart or record as formed by the recording device embodying this invention.

Figure 4 is a sectional side elevation of the inclination recording device embodying this invention.

Figure 5 is a sectional end elevation taken substantially on the line 5—5 of Figure 4.

Figure 6 is a detached elevation of a solution container shell.

In the preferred embodiment of this invention, illustrated in the accompanying drawings, 1 indicates a sub screw-threaded as indicated at 2 to the drill stem or pipe 3. The sub 1 is secured at the threads 4 to a sample taking device 5. The sample taking device 5 is herein illustrated as a punch-type core drill, but any other suitable or desirable form of sample taking device may be employed such, for example, as a rotary core drill or the like. The sample taking device 5 is herein illustrated as including a body or sleeve 6 within which a tubular member 7 is slidably mounted. The construction is similar to that of a jar inasmuch as when the end 8 of the tubular member is collapsed within the body 6, the same engages and is driven downwardly by the end 9 of the sub 1, and the core taking tube 10 is driven into the formation by means of the block 11 engaging the end 12 of the body 6 when the weight of the drill stem is dropped onto the bottom of the hole being formed, thereby driving the tube 10 into the formation, as illustrated at 13 in Figure 2.

Mounted within the sub 1 are means for recording the inclination of the hole or well being formed as the sample is being taken so as to permit the recordation of the inclination at which the sample is taken. The recordation of the angle at which the sample of the formation is taken bears an important relation to the sample and to the determinations to be made therefrom as to the existence of minerals, oils, or the like, in that it enables the ascertaining of the true inclination of the formations from the sample.

The inclination and recording means embodying this invention includes a supporting member 14 screw-threaded within the sub 1 as indicated at 15. The supporting member 14 is secured at its opposite end to the body 16 of the recording means. The body 16 is closed at its lower end by means of a plug 17 and at its opposite end by the connecting member 14 which is secured to the body 16 at a fluid-tight connection 18. The connecting member 14 is provided with an integral closing web 19 above the body 16.

Mounted within the body 16 is a shell 20 which is secured at its upper end to a retaining nut 21. Mounted within the shell 20 is a solution container 22 within which a solution of any suitable kind can be placed. The solution container is provided with an outlet tube 23 which is closed by an outlet control valve 24 and an air vent tube 51. The tube 51 permits air contained in the lower chamber 26 to enter the upper container 22 when the solution is discharge from such upper chamber into the lower chamber. The tube 23 connects with a second tube 25 which extends downwardly to a point within the recording chamber 26 as formed by the cylindrical member 27 mounted within the shell 20 and secured to the solution container, as indicated at 28. Secured at the bottom of the cylindrical member 27 is a syphon holder 29. Secured to the lower end of the siphon holder 29, as indicated at 30, is a solution receiving container 31 into which the solution is drained from the recording chamber 26 after the record of the inclination of the device has been recorded in the recording chamber 26 by the position of the solution therein. Mounted in the siphon holder 29 is a siphon tube 32, the longest leg of which is telescoped within a drain tube 33 which extends into the solution receiver 31. The siphon tube 32 has a U-bend at its upper portion, the shorter leg of which terminates close to the inside base of the siphon holder 29. Mounted within the siphon holder 29 is a vent tube 35 which extends upwardly above the top of the siphon tube 32 and is telescoped within a tube 36 at its lower end which tube 36 communicates with the solution receiver 31. The tube 35 is for the purpose of permitting air contained within the reservoir 31 to pass from the chamber 31 into the recording chamber 26 when the solution is discharged into the chamber 31.

Means are provided for tripping the valve 24 to allow the solution contained within the container 22 to drain into the recording chamber 26, which means are herein illustrated as comprising a trip rod 37 which extends longitudinally of the body 16 and passes through packing glands 38 and 39 at the upper and lower portions of the body 16 and connecting member 14, respectively. Secured to the rod 37 is an arm 40 which is pivotally connected with a valve stem 41, as indicated at 42. The valve stem 41 is connected at its lower end to the valve cap 43 so that when the trip rod 37 is forced upwardly, the cap 43 is raised from the end of the tube 23, permitting the solution contained within the solution container 22 to drain into the recording chamber 26 until the solution reaches the elevation of the top of the siphon tube 32 at which time the solution drains through the siphon tube 32 into the solution receiver 31. As the solution reaches its maximum height in the recording chamber 26, a permanent record of this position is made by means of a recording sheet 44 mounted within the chamber 26 in the form of a cylinder, completely enclosing the solution chamber 26. The recording sheet 44 is held in position at its ends between the siphon container 29 and sleeve 27 at its lower end, as illustrated at 45 and at its upper end between the sleeve 27 and the lower end of the solution container 22, as indicated at 46.

The solution employed is preferably a solution of mercuric nitrate prepared by placing pure mercury in a container and adding concentrated nitric acid to the same. The reaction between the nitric acid and mercury is allowed to continue until the fuming stops. The solution formed is then poured from the excess of mercury and permitted to cool. The precipitate formed is dried. The precipitate is dissolved in a dilute solution of nitric acid (3/4ths distilled water, 1/4th concentrated nitric acid) and is ready for use. Commercial mercuric nitrate may be employed if desired, preferably in nitric acid solution. The recording sheet 44 is preferably formed of a thin sheet of copper or like metal which has been cleaned so that the solution of mercuric nitrate deposits mercury on the inner periphery of the cylinder formed. Any other suitable or desirable solution and recording sheet may be employed which will produce a record of the position of the solution within the recording chamber 26.

In Figure 3, the recording sheet 44 is illustrated as with the deposit 47 approximately as formed thereon, giving at the upper elevation of the solution within the recording chamber 26 a curved line 48, if apparatus is not vertical when record is made, which indicates the position of the top of the solution therein. The angle of inclination of the hole or the punch tube 13 is calculated by employing the formula $$B = \tan^{-1} \frac{\pi A}{L}$$

in which the angle of inclination is indicated by B. The dimensions A and L are illustrated in Figure 3, A representing the maximum height of the record whereas L represents the axial length of the curve 48.

The direction of inclination is determined by use of the formula $$G = \frac{360 Y°}{L},$$

Y being illustrated in Figure 3.

G as found by this formula is added in a clockwise direction to the bearings of the line through the center of the sub and the zero line on the interior of the sub for orienting purposes. This bearing is obtained by orienting the drill pipe out of the hole by means of a magnetic orienter of any suitable or desirable construction, one form of which is illustrated in my co-pending application filed August 31, 1927 Serial No. 216,544 and issued November 14, 1933, as Patent No. 1,935,078. The zero line on the sub 3 will be the same as the zero line on the core barrel so that the correction from the mercury bottle record can be applied to the core taken by the sample taking device.

In assembling the recording device embodying this invention, the recording sheet 44 is placed in position so that the vertical line formed by its edges bisects the rectangular slot 49 in the shell 20, the edges of the recording sheet being thereby aligned with the zero line 50 formed longitudinally on the shell 20. The zero line of the shell 20 is aligned with the zero line of the sub 1.

It is preferable that the recording sheet 44 prior to its use be washed with a dilute solution of nitric acid preferably formed of ½ distilled water and ½ concentrated nitric acid so that all oxidation is removed from the metal of which the recording sheet 44 is formed. In deep hole practice, it may be found better to employ a copper plate slightly gold plated to prevent oxidation of the copper as the recording device is lowered into the hole. The cleaning of the recording sheet should be performed at the hole immediately before the recording device is run therein so as to cut down the time in which the copper of which the recording sheet is formed can oxidize.

In operation, the sample taking device 5 is lowered into the well on the drill stem 3 and jarred to force the member 10 into the formation to take the desired sample. As the sample taking device is jarred, the same actuates the trip rod 37 of the recording device, thereby permitting the solution to drain from the solution container 22 into the recording chamber 26 in which the permanent record of the inclination of the hole is taken, as heretofore particularly described.

Having fully described the preferred embodiment of my invention, it is to be understood that I do not wish to be limited to the details herein set forth, but my invention is of the scope of the following appended claims.

I claim:

1. A well surveying device adapted to enter a bore hole including a record chamber containing a recording surface, a second chamber located above the record chamber, means for delaying transfer of liquid from the second chamber to the record chamber, and a siphon for promptly automatically initiating removal of the liquid from the record chamber when the surface of liquid therein has risen to the bend of the siphon.

2. A well surveying device adapted to enter a bore hole including a record chamber containing a recording surface, a second chamber located above the record chamber, means entirely contained in the apparatus for delaying transfer of liquid from the second chamber to the record chamber, and a siphon for promptly automatically initiating removal of the liquid from the record chamber when the surface of liquid therein has risen to the bend of the siphon.

3. A well surveying device adapted to enter a bore hole including a record chamber containing a recording surface, a second chamber located above the record chamber, means comprising a valve for delaying transfer of liquid from the second chamber to the record chamber, and a siphon for promptly automatically initiating removal of the liquid from the record chamber when the surface of liquid therein has risen to the bend of the siphon.

4. A well surveying device adapted to enter a bore hole including a record chamber containing a recording surface, a second chamber located above the record chamber, means for delaying transfer of liquid from the second chamber to the record chamber, said means being adapted to be actuated when said device reaches the bottom of said bore hole, and a siphon for promptly automatically initiating removal of the liquid from the record chamber when the surface of liquid therein has risen to the bend of the siphon.

5. A well surveying device adapted to enter a bore hole including a record chamber containing a recording surface, a second chamber located above the record chamber, valve means for delaying transfer of liquid from the second chamber to the record chamber, means for actuating said valve means when said device reaches the bottom of said bore hole, and a siphon for promptly automatically initiating removal of the liquid from the record chamber when the surface of liquid therein has risen to the bend of the siphon.

6. A well surveying device adapted to enter a bore hole including a record chamber containing a recording surface, a second chamber located above the record chamber, a valve for delaying transfer of liquid from the second chamber to the record chamber, a movable rod connected to said valve for actuating the same when the device reaches a predetermined position with respect to the bottom of the bore hole, and a siphon for promptly automatically initiating removal of the liquid from the record chamber when the surface of liquid therein has risen to the bend of the siphon.

OMAR A. CAVINS.